(12) United States Patent
Taniguchi et al.

(10) Patent No.: US 6,595,092 B1
(45) Date of Patent: Jul. 22, 2003

(54) CUTTING TIP, CUTTING METHOD, AND CUTTING-PROCESSED ELEMENT

(75) Inventors: Takao Taniguchi, Anjo (JP); Kouji Ohbayashi, Anjo (JP); Shigeharu Ikeda, Anjo (JP); Minoru Hidaka, Anjo (JP); Hironori Fukushima, Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 09/616,899

(22) Filed: Jul. 14, 2000

(30) Foreign Application Priority Data

Jul. 16, 1999 (JP) ............................................. 11-202867
Jul. 16, 1999 (JP) ............................................. 11-202868

(51) Int. Cl.⁷ ............................. B23B 1/00; B23B 27/00
(52) U.S. Cl. ........................ 82/1.11; 407/114; 407/115
(58) Field of Search ..................... 82/1.11, 901, 902; 407/114, 115, 118, 120, 1

(56) References Cited

U.S. PATENT DOCUMENTS

| 4,597,695 A | * | 7/1986 | Johnson ..................... 407/113 |
| 5,246,315 A | * | 9/1993 | Hansson et al. ............ 407/114 |
| 6,026,719 A | * | 2/2000 | Li ................................ 82/1.11 |
| 6,082,936 A | * | 7/2000 | Moriguchi et al. ......... 407/119 |
| 6,099,209 A | * | 8/2000 | Murray et al. ................. 407/1 |

FOREIGN PATENT DOCUMENTS

| JP | 09-207007 | 8/1997 |
| JP | 10-286703 | 10/1998 |

* cited by examiner

*Primary Examiner*—Henry W. H. Tsai
(74) *Attorney, Agent, or Firm*—Lorusso, Loud & Kelly

(57) ABSTRACT

A cutting tip has a cutting face and a flank face. A compression face for plastically deforming a workpiece is provided between the cutting face and the flank face. The cutting tip allows work-hardening to be easily performed by plastic deformation of the cut-finished surface during cutting, without adding a separate process step.

21 Claims, 19 Drawing Sheets

CUTTING TIP, CUTTING METHOD, AND CUTTING-PROCESSED ELEMENT

INCORPORATION BY REFERENCE

The entire disclosures of Japanese Patent application Nos. H11-202867 and H11-20268, both filed Jul. 15, 1999, inclusive of their specifications, claims and drawings are incorporated herein by reference.

BACKGROUND OF THE INVENTION

1. Field of the Invention

The present invention relates to a novel cutting tip used as a tool for a cutting process, and a cutting method using the novel cutting tip.

2. Description of the Related Art

When a cutting process is performed on a metallic material, the process is normally performed by setting a cutting tip in a machine tool, such as a lathe or the like, and by moving the cutting tip relative to the workpiece while keeping the cutting tip in contact with the workpiece.

Cutting tips vary in correspondence to the shapes of workpieces, desired shapes of cut, and the like. For example, there are cutting tips of various shapes, such as a triangular shape, a quadrangular shape, a rhombus shape, and the like.

As shown in FIG. 21, a conventional tip 9, regardless of what shape it has, has a cutting face 91 and a flank face 92, and a cutting edge 95 formed along a line of intersection between the cutting face 91 and the flank face 92. Normally, the cutting tip 9 is set in a shank 99 that holds the cutting tip.

At the time of cutting, the cutting tip 9 is normally placed in contact with a workpiece, with the cutting face 91 standing with respect to the surface of the workpiece, and then it is moved relative to the workpiece. As a result, swarf is separated from the surface of the workpiece, with the cutting edge 95 being a boundary, and it is scooped out onto the cutting face 91. Cutting processes for metallic materials achieve excellent dimensional precision, but cannot strengthen processed surfaces, unlike a process imparting plastic deformation. Therefore, various methods for strengthening a finished cut surface have been proposed.

For example, there is a method in which in a separate compression process, after the cutting process, the cut surface is pressed with a fillet tool or the like, thereby work-hardening the cut surface.

Japanese Utility Model Application Laid-Open No. HEI 7-20215, Japanese Utility Model Application Laid-Open No. SHO 63-116219, and like publications, have disclosed methods using a composite tool combining a cutting tool feature with a pressing tool feature. The use of such a tool makes it possible to perform successive cutting and compression processes using the same tool.

However, the above-described conventional cutting methods have the following problems.

In the method using a fillet tool or the like, the compression step needs to be separate from the cutting step, so that the overall process becomes complicated.

In the method using a composite tool combining a cutting tool feature with a pressing tool feature, the tool is limited to a specific purpose such as forming a hole, forming a flat surface, or the like. Therefore, the method is not easily applied to various different cutting processes.

SUMMARY OF THE INVENTION

The object of the present invention is to overcome the aforementioned problems. The invention is intended to provide a cutting tip that allows a compression process to be easily performed on a finished cut surface, and a cutting method using the cutting tip.

A first aspect of the invention provides a cutting tip having a cutting face and a flank face, wherein a compression-producing face for plastically deforming the workpiece is provided in at least a portion of an area between the cutting face and the flank face. The compression face intersects both the cutting face and a flank face at angles substantially less than 180 degrees, i.e. to define lines of intersection therewith.

The compression-producing face (hereinafter "compression face") is a face for plastically deforming a workpiece, as mentioned above. The expression "plastic deformation" as used herein refers to work-hardening involving dislocation.

The compression face is provided on at least a portion of the area between the cutting face and the flank face. Therefore, the compression face may be provided throughout the entire length of a boundary portion between the cutting face and the flank face or may be provided in a portion thereof or in a plurality of separate sites therein.

With the cutting tip provided with a compression face between the cutting face and the flank face, it is possible to produce plastic deformation of the workpiece simultaneously with the cutting process, in a single step, merely by cutting in substantially the same manner as a conventional method.

When cutting with the cutting tip of the invention, the cutting tip is brought into contact with a surface of a workpiece and moved relative thereto in a cutting direction, with the compression face of the cutting tip facing the surface of the workpiece and with the cutting face standing with respect to that surface. In this manner, first, a portion of the workpiece that contacts the cutting face is separated as swarf. A portion of the material of the workpiece facing the compression face is left as a work-hardened "remaining" portion. Then, as the relative movement of the cutting tip progresses, the cut surface left on the workpiece is pressed by the compression face and thereby undergoes plastic deformation and becomes work-hardened. Hence, a work-hardened portion strengthened by plastic deformation is formed on the cut-finished surface over which the compression face of the cutting tip has passed during the cutting process.

According to a second aspect of the invention, a cutting edge may be formed on an intersection line between the compression face and the cutting face. That is, if a clear cut edge is provided at the intersection line between compression face and the cutting face, the separation of swarf can be smoothly performed. Therefore, the subsequent compression of the remaining portion of the surface material by the compression face can also be smoothly performed.

The cutting edge is the starting point for separation of swarf.

According to a third aspect of the invention, the angle formed between the compression face and the cutting face is less than 125 degrees. If this angle is not less than 125 degrees, the intersection line between the compression face and the flank face may act as a cutting edge, thereby creating a problem of failing to properly separate swarf from the workpiece portion and a problem of failing to achieve work-hardening by plastic deformation.

According to a fourth aspect of the invention, the height of the intersection line between the compression face and the cutting face may be set in accordance with a desired amount of plastic deformation. That is, plastic deformation is produced in that portion of the workpiece facing the compression face. Therefore, by setting the height of the intersection line, the amount of plastic deformation produced in the workpiece material can be easily adjusted.

The "height of the intersection line" can be expressed by, for example, the distance from the intersection line to the end of the compression face as viewed from the cutting face.

It is also possible to provide the compression face in the form of a curved surface whereby the intersection line is in the form of a curved line.

A fifth aspect of the invention provides a cutting method for cutting a workpiece by use of a cutting tip having a cutting face, a flank face, and a compression face provided between the cutting face and the flank face, and wherein that portion of the workpiece facing the cutting face is separated as swarf by relative movement of the cutting tip in a cutting direction while the compression face contacts a remaining portion of the workpiece facing the compression face to plastically deform that facing (remaining) portion by compression thereof.

In this cutting method, since a cutting tip having a compression face is used, compression, that is plastic deformation, is easily applied to a cut surface of a workpiece merely by performing a normal cutting operation, as described above. Therefore, a work-hardened portion can be formed on the cut surface of the workpiece, and the cut-finished surface can be easily strengthened.

A sixth aspect of the invention provides a finished workpiece having a cut-finished surface which has been work-hardened by plastic deformation caused by pressing with the compression face.

The formation of the finished cut surface of the workpiece is obtained by using the above-described special cutting tip. Therefore, it is possible to form a work-hardened portion on the cut-finished surface merely by performing a cutting operation substantially the same as a conventional method. Hence, there is no need to provide a separate, additional process step for strengthening the cut-finished surface after the cutting process step. Consequently, a finished workpiece having a strengthened cut surface can be provided at low cost.

Since the work-hardened portion is formed by plastic deformation by the compression face of the cutting tip, the work-hardened portion can be stably and uniformly formed as long as the cutting operating parameters are fixed.

Therefore, the finished workpiece in accordance with the invention is low-cost and has a uniformly strengthened cut-finished surface. Consequently, the durability of a machine constructed by using the finished workpiece as an element thereof is improved, and other applications for the finished workpiece are expanded.

A seventh aspect of the invention provides a cutting tip having a cutting face and a flank face and a corner portion, where a compression face for plastically deforming a workpiece is provided between the cutting face and the flank face. If there are a plurality of corner portions, one or more or all of the corner portions may be provided with compression faces in accordance with the intended application.

The compression face is a face for plastically deforming a workpiece, as mentioned above. The expression "plastic deformation" as used herein refers to work-hardening involving dislocation.

The operation and advantages of the invention will next be described.

As described above, the cutting tip of the invention has a compression face between the cutting face and the flank face in a corner portion. Therefore, using the cutting tip, it is possible to impart plastic deformation to a workpiece simultaneously with cutting thereof, merely by executing a cutting method that is substantially the same as a conventional method.

For cutting, the cutting tip's corner portion having the compression face is brought into contact with a surface of a workpiece and the cutting tip is moved relative to the workpiece in a cutting direction, with the cutting face of the cutting tip standing with respect to the workpiece surface. Thereby, the portion of the workpiece that contacts the cutting face is separated as swarf. The portion of the workpiece facing the compression face becomes a work-hardened portion that remains on the workpiece.

Then, as the relative movement of the cutting tip progresses, the remaining portion left on the workpiece is pressed by the compression face and thereby. undergoes compression (or plastic deformation), and becomes work-hardened. Hence, a work-hardened portion strengthened by the plastic deformation is formed on the cut-finished surface over which the compression face of the cutting tip passes during the cutting process.

An eighth aspect of the invention provides a cutting tip having a cutting face and a flank face and two corner portions, wherein a compression face for plastically deforming a workpiece is provided between the cutting face and the flank face in at least one of the corner portions. In this eighth aspect, the cutting tip of the invention is a cutting tip for grooving. The use of the cutting tip of the invention make it possible to easily strengthen the bottom angle portions of a groove formed with the cutting tip.

That is, when a cutter of the invention carries a tip which forms a groove, the two corner portions of the cutting tip are brought into contact with a surface of a workpiece and the cutting tip is relatively moved in a cutting direction, with the cutting face of the cutting tip standing with respect to the surface of the workpiece, whereby that portion of the workpiece that contacts the cutting face is separated as swarf.

In cutting with a corner portion having a compression face, that portion of the workpiece material facing the cutting face is separated as swarf (as mentioned above), whereas that portion facing the compression face becomes a "remaining portion" that is left on the workpiece. Then, as the relative movement of the cutting tip progresses, the remaining portion left on the workpiece is pressed by the compression face and thereby undergoes plastic deformation, and becomes work-hardened. Hence, work-hardened portions are formed in the bottom angle portions of the groove through which the compression face passes during the cutting process.

Thus, if the cutting tip is used for cutting a groove, it is possible to easily strengthen bottom angle portions of the groove merely by performing a cutting operation, substantially the same as a conventional operation, without adding a separate process step.

Furthermore, according to a ninth aspect of the invention, a honing face may be formed on a cutting edge formed on an intersection line between the cutting face and the flank face, the angle formed between the compression face and the cutting face is smaller than the angle formed between the honing face and the cutting face, and the maximum width of the compression face viewed from the cutting face is greater than the maximum width of the honing face.

A cutting edge is formed on a intersection line between a cutting face and a flank face of a cutting tip, as described above. In many cases, a honing face is formed on the cutting edge by a honing process in order to prevent chipping of an angle portion (vertex portion) of the cutting edge. Although the honing face is provided between the cutting face and the flank face, similar to the compression face, the purpose of the honing face is different from that of the compression face, and the honing face provides substantially no compression of the cut-finished surface. However, if a compression face is provided so that the angle of the compression face with respect to the cutting face is smaller than the angle of the honing face with respect to the cutting face and so that the maximum width of the compression face is greater than the maximum width of the honing face, as described above, it becomes possible to easily work-harden the "remaining" portion of the material of the workpiece.

Furthermore, according to a tenth aspect of the invention, a cutting edge may be formed on an intersection line between the cutting face and the compression face. That is, if a clear cut edge is provided on the intersection line between the compression face and the cutting face, the separation of swarf from the remaining portion can be smoothly performed. Therefore, the subsequent compression of the remaining portion by the compression face can be smoothly performed.

"Cutting edge" herein refers to an angle portion formed by intersecting faces of a cutting tip which, in cutting, is the starting point of separation of swarf.

According to an eleventh aspect of the invention, the line of intersection between the compression face and the cutting face is a straight line. In this case, the intersection line defines a constant amount of the remaining workpiece material pressed by the compression face, so that the amount of plastic deformation and the like can easily be set. Furthermore, it is also easy to form a compression face on the cutting tip. Of course, as previously noted, it is also possible to provide the compression face in the form of a curved face and the intersection line as a curved line.

In a twelfth aspect, the present invention provides a cutting method for cutting a workpiece using a cutting tip having a cutting face, a flank face and a corner portion, and a compression face provided between the cutting face and the flank face as a corner portion, and wherein that portion of the workpiece facing the cutting face is separated as swarf by relative movement of the cutting tip in a cutting direction while the compression face is in contact with the workpiece, and a remaining portion left in a position facing the compression face is plastically deformed by pressing the remaining portion with the compression face.

In this cutting method, since the cutting tip having the compression face is used, it is possible to easily cause plastic deformation of a cut surface of a workpiece merely by performing an ordinary cutting process, as described above. Therefore, a work-hardened portion can be formed on the cut surface of the workpiece, and the cut-finished surface can easily be strengthened.

A thirteenth aspect of the invention provides a cutting method for forming a groove in a workpiece using a cutting tip having a cutting face, a flank face and two corner portions, and a compression face between the cutting face and the flank face in at least one of the corner portions. In this method of cutting a groove, the workpiece material facing the cutting face is separated as swarf by relative movement of the cutting tip in a cutting direction while the corner portion having the compression face is in contact with the workpiece at a position corresponding to a bottom angle portion of the cut groove, and a remaining portion left in a position facing the compression face is plastically deformed by pressing with the compression face.

In this groove cutting method, since the cutting tip having the compression face is used, it is possible to easily cause plastic deformation in at least one of bottom angle portions of the cut groove merely by performing an ordinary cutting process, as described above. Therefore, a work-hardened portion can be formed in the at least one bottom angle portion of the groove of the workpiece, and the groove can easily be strengthened.

A fourteenth aspect of the invention provides an element having a cut-finished surface which has been subjected to a cutting process, wherein formation of the cut-finished surface is performed by using a cutting tip which has a cutting face, a flank face and a corner portion and has, between the cutting face and the flank face in the corner portion, a compression face for plastically deforming a workpiece, and wherein the cut-finished surface has a work-hardened portion formed by plastic deformation caused by pressing with the compression face.

The formation of the cut-finished surface of the workpiece is accomplished by using the above-described special cutting tip. Therefore, a work-hardened portion can be formed on the cut-finished surface merely by performing a cutting method substantially the same as a conventional method. Hence, since there is no need for a separate strengthening step after the cutting process, the finished element having a strengthened cut-finished surface can be provided at low cost.

Furthermore, since the work-hardened portion is formed by the compression face of the cutting tip, the work-hardened portion can be stably and uniformly formed as long as the cutting conditions remain fixed.

Therefore, the finished workpiece formed by the invention is low-cost and has a uniformly strengthened cut-finished surface. Hence, a machine constructed with the finished workpiece as an element thereof has improved durability, and the potential uses of the finished workpiece are expanded.

A fifteenth aspect of the invention provides a cutting-processed element having a groove formed by a cutting process, wherein formation of the groove is performed by using a cutting tip which has a cutting face, a flank face, two corner portions and, between the cutting face and the flank face in at least one of the corner portions, a compression face for plastically deforming the workpiece material, and wherein the at least one of the bottom angle portions of the groove is work-hardened by plastic deformation caused by pressing with the compression face.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Embodiment 1

A cutting tip according to a first embodiment of the invention and a method using the cutting tip will now be described with reference to FIGS. 1 to 7.

Figure 2:
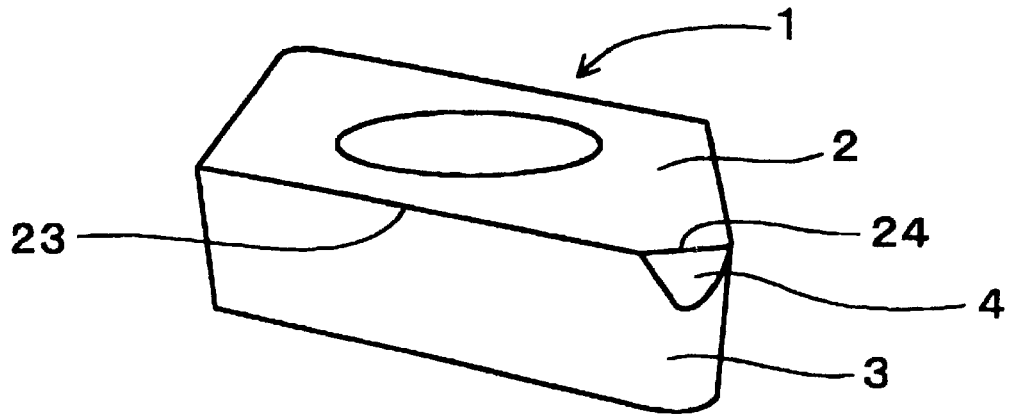
FIG. 2 is a perspective view of the cutting tip of the first embodiment.
Figure 3:
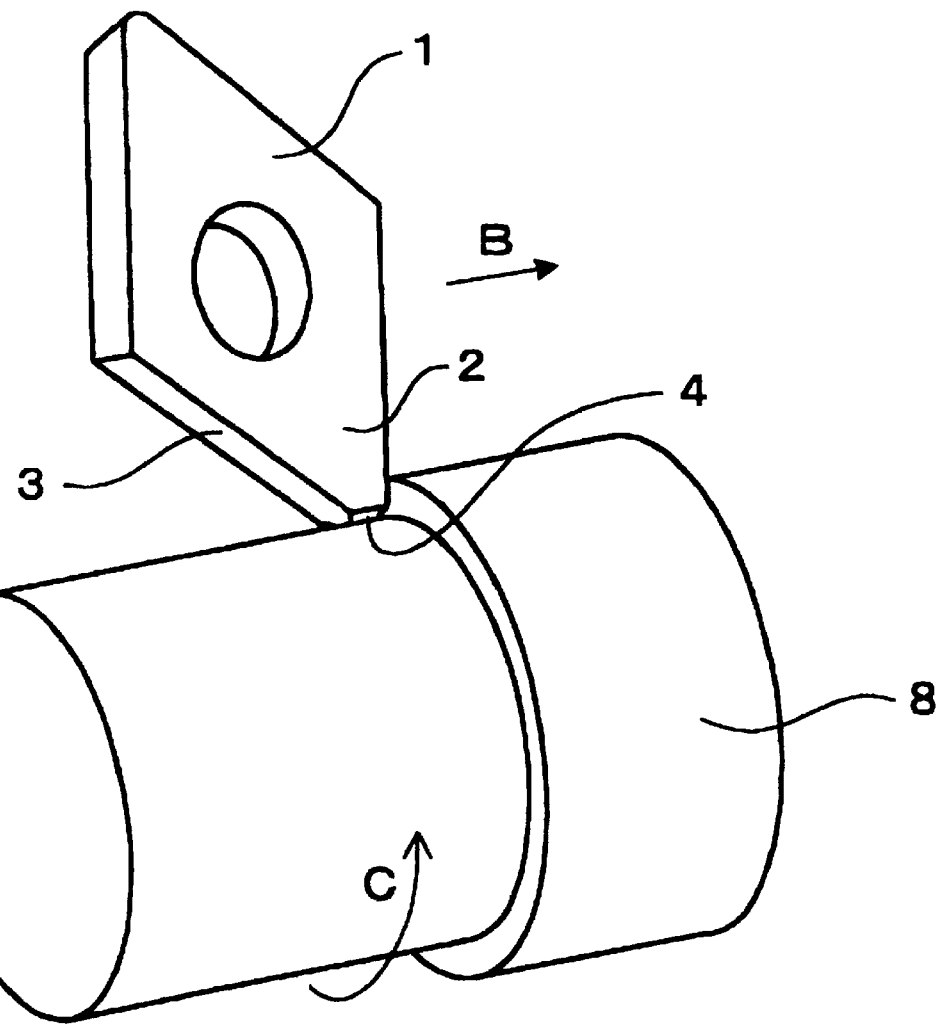
FIG. 3 is a diagram illustrating the position of the cutting tip relative to a workpiece in the first embodiment.

As shown in FIG. 3, cutting tip 1 is a tip that is used to cut an outer peripheral surface portion of a cylindrical element 8 ("workpiece"). The cutting tip 1 has a rhombus shape. As shown in FIGS. 1 and 2, the cutting tip 1 has a cutting face 2 and a flank face 3. A compression-producing face 4 for plastically deforming the material of the workpiece is provided between the cutting face 2 and the flank face 3.

Figure 1A:
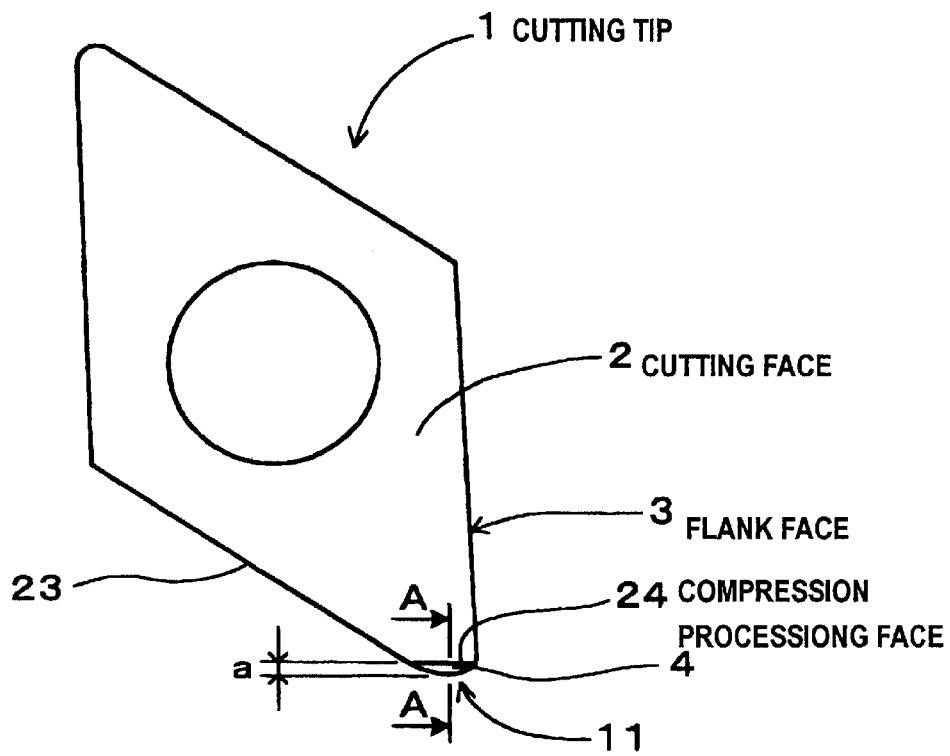
FIG. 1(a) is a view of the cutting face of a first embodiment of a cutting tip of the present invention, FIG. 1(b) a side view of the flank face.
Figure 1B:
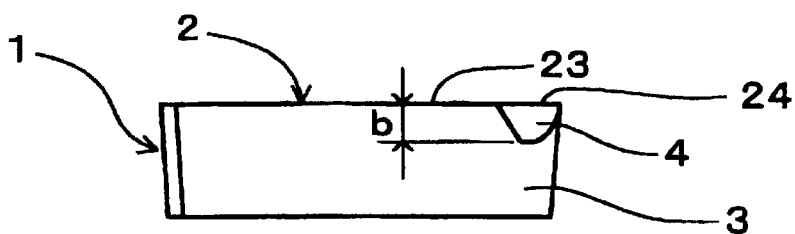
FIG. 1(c) is a sectional view taken along line A—A in FIG. 1(a).

The cutting face 2 has a rhombus shape as shown in FIG. 1(a). As shown in FIGS. 1(b) and 2, the flank face 3 is formed along the rhombus shape so as to intersect the cutting face 2 at an acute angle that is slightly smaller than a right angle. In the cutting tip 1, the entire line of intersection between the cutting face 2 and the flank face 3 forms a cutting edge 23.

Furthermore, in this embodiment, the compression face 4 is provided between the cutting face 2 and the flank face 3, as described above, in an acute angle corner 11, i.e. in one of the of two opposing acute angle corners of the rhombus. In manufacture of the cutting tip 1, the compression face 4 may be provided, for example, by cutting off, at the corner portion 11, a portion of the cutting edge 23 formed on the intersection line 24 between the flank face 3 and the cutting face 2.

As shown in FIGS. 1 and 2, the compression face 4 is provided so that intersection line 24 between the compression face 4 and the cutting face 2 is a straight line, and so that when in use, the intersection line 24 is parallel to the processed surface of the workpiece 8.

A cutting edge is also formed on the intersection line 24.

Figure 1C:
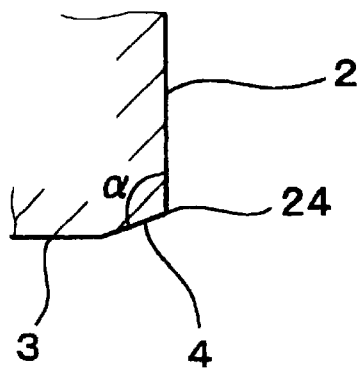

A specific example of the relative dimensions of the cutting tip 1 shown in FIG. 1(c), would have the angle α between the compression face 4 and the cutting face 2 at about 106 degrees. As shown in FIGS. 1(a) and 1(b), the height a to the intersection line 24 between the compression face 4 and the cutting face 2 would be 0.1 mm from the flank face and the height b of the compression face 4 from the flank face 2 would be 0.35 mm. These dimensions can be changed in accordance with the properties of the workpiece, the intended purpose of the process, and the like.

When the outer peripheral surface of the cylindrical element 8 used as the workpiece is to be cut by using the cutting tip 1 of this embodiment, the workpiece 8 and the cutting tip 1 are set in a lathe (not shown) so as to have the positional relationship shown in FIGS. 3 to 6. That is, the compression face 4 of the cutting tip 1 is directed toward the workpiece 8, and the cutting face 2 faces the cutting direction (in a direction opposed to the rotational direction C of the workpiece 8). In this case, the intersection line 24 between the compression face 4 and the cutting face 2 is set parallel to the longitudinal axis of the workpiece 8. The tilt angle β of the flank face 3 facing in an advance direction B of the cutting tip 1 is set, for example, to 3 degrees relative to a plane cutting the central, rotational axis of the workpiece at 90 degrees.

Figure 4:
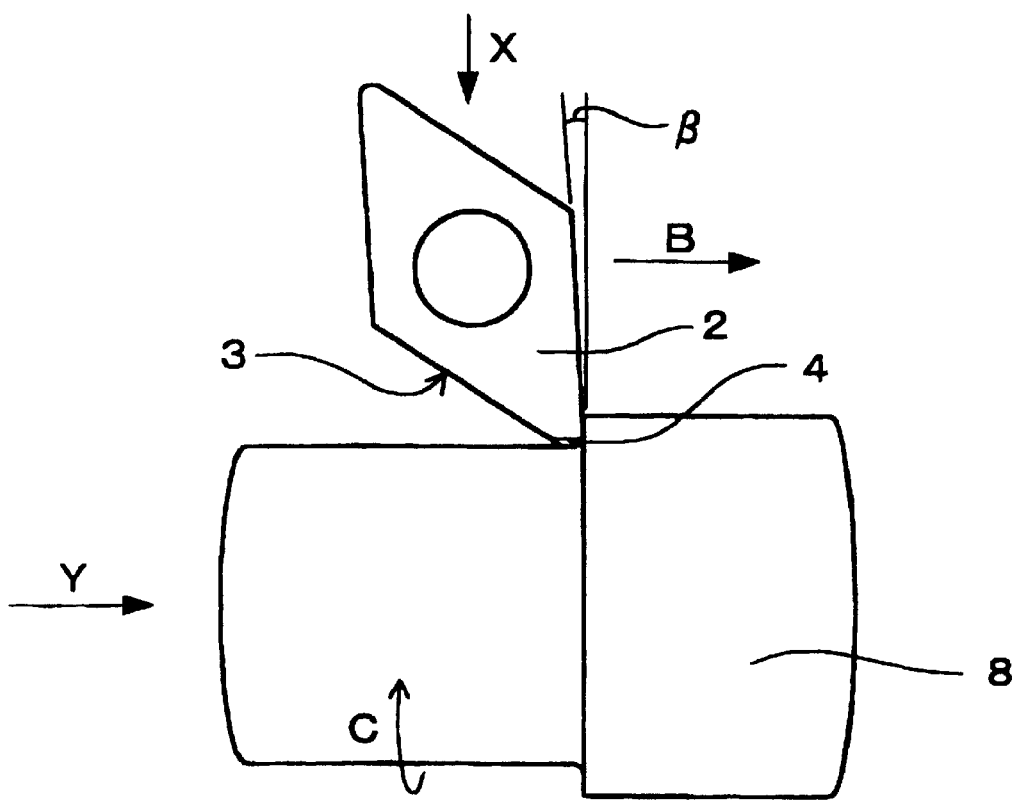
FIG. 4 shows the positional relationship between the cutting tip and the workpiece according to the first embodiment, viewed from in front of the cutting position.
Figure 5:
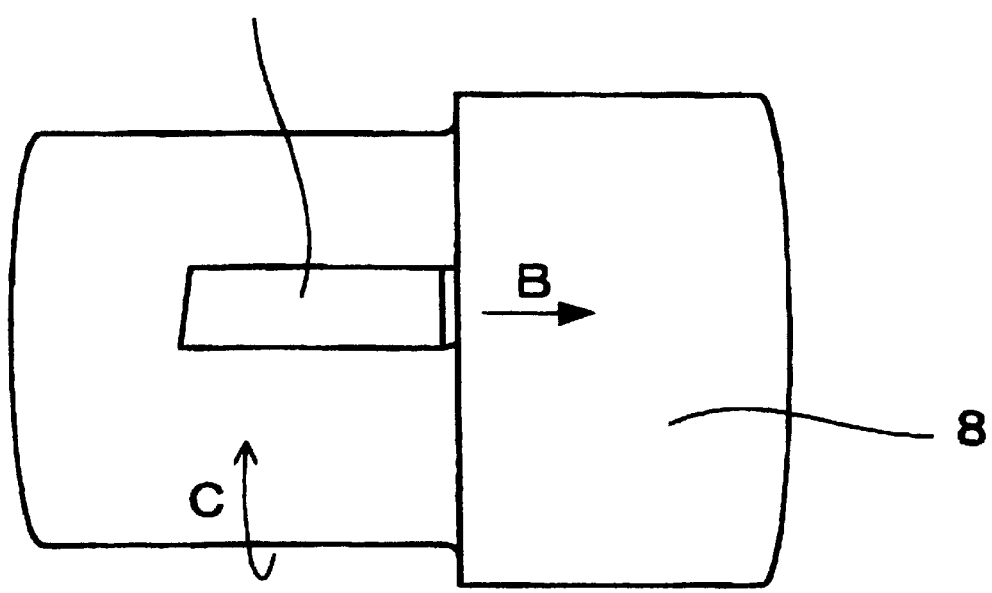
FIG. 5 is a view from the direction of an arrow X in FIG. 4.
Figure 6:
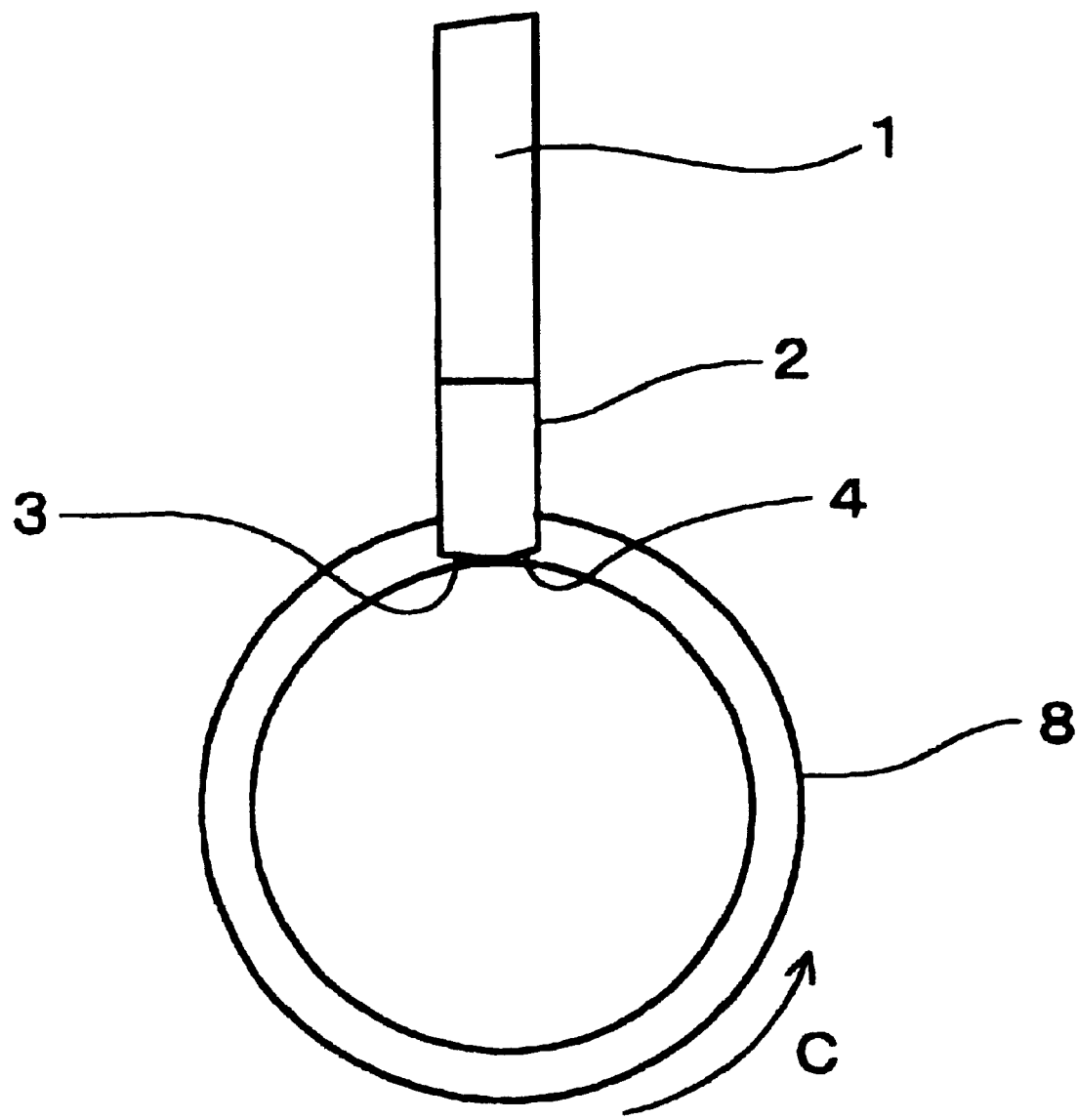
FIG. 6 is a view from the direction of an arrow Y in FIG. 4.

As indicated in FIGS. 4 and 5, the workpiece 8 is rotated in the direction of the arrow C and the cutting tip 1 is gradually advanced in the direction of the arrow B while the state of contact between the cutting tip 1 and the workpiece 8 is maintained constant. That is, the cutting operation is performed by a method that is substantially the same as a conventional cutting method, except that the cutting tip 1 of the present invention is used and, simultaneously, the cut-finished surface is work-hardened. This latter process feature will be described with reference to FIG. 7. which is a diagram illustrating the mechanism of cutting with the cutting tip 1.

Figure 7:
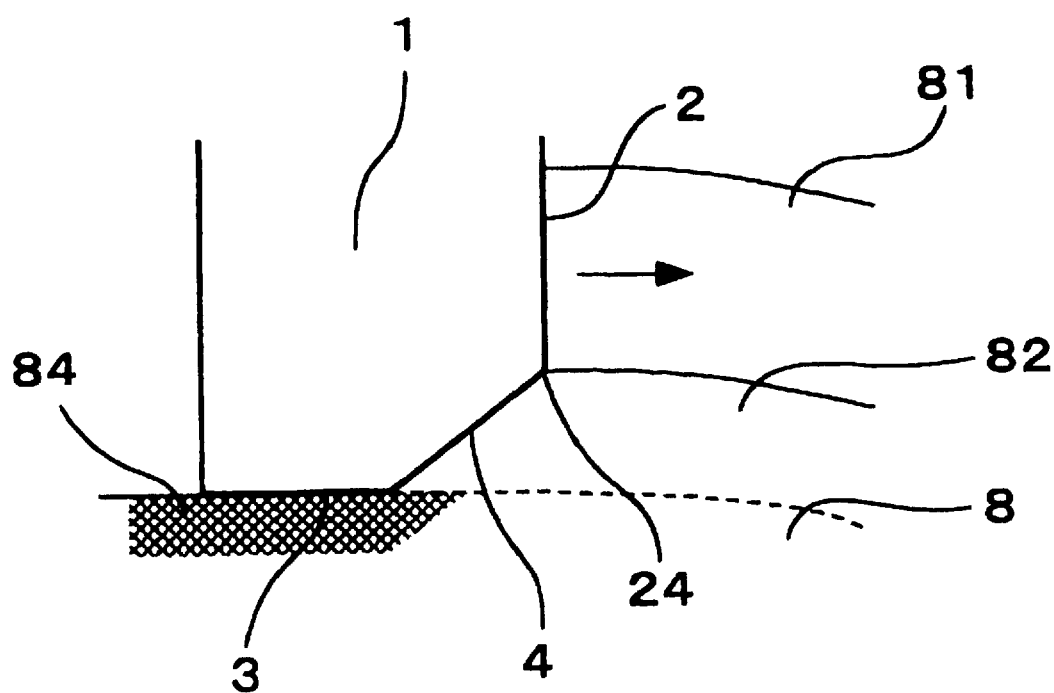
FIG. 7 illustrates the mechanism of forming the work-hardened portion during cutting according to the first embodiment.

As shown in FIG. 7, the cutting tip 1, which while remaining in contact with the workpiece 8, is relatively advanced in the cutting direction and separates a portion that contacts the cutting face 2 as swarf 81. In this embodiment, since the intersection line 24 between the compression face 4 and the cutting face 2 forms a cutting edge, the swarf 81 is smoothly separated from the remaining portion 82 of the workpiece.

The portion 82 remaining on the workpiece 8 and facing the compression face 4 is pressed by the compression face 4 and thereby forms a work-hardened layer 84 by plastic deformation.

As a result, the surface cut by the cutting tip 1 has a work-hardened layer 84.

Thus, in using the cutting tip 1 of the first embodiment, the presence of the compression face 4 makes it possible to easily work-harden the cut surface simultaneously with the cutting process without need for a separate process step.

Embodiment 2

Figure 8:
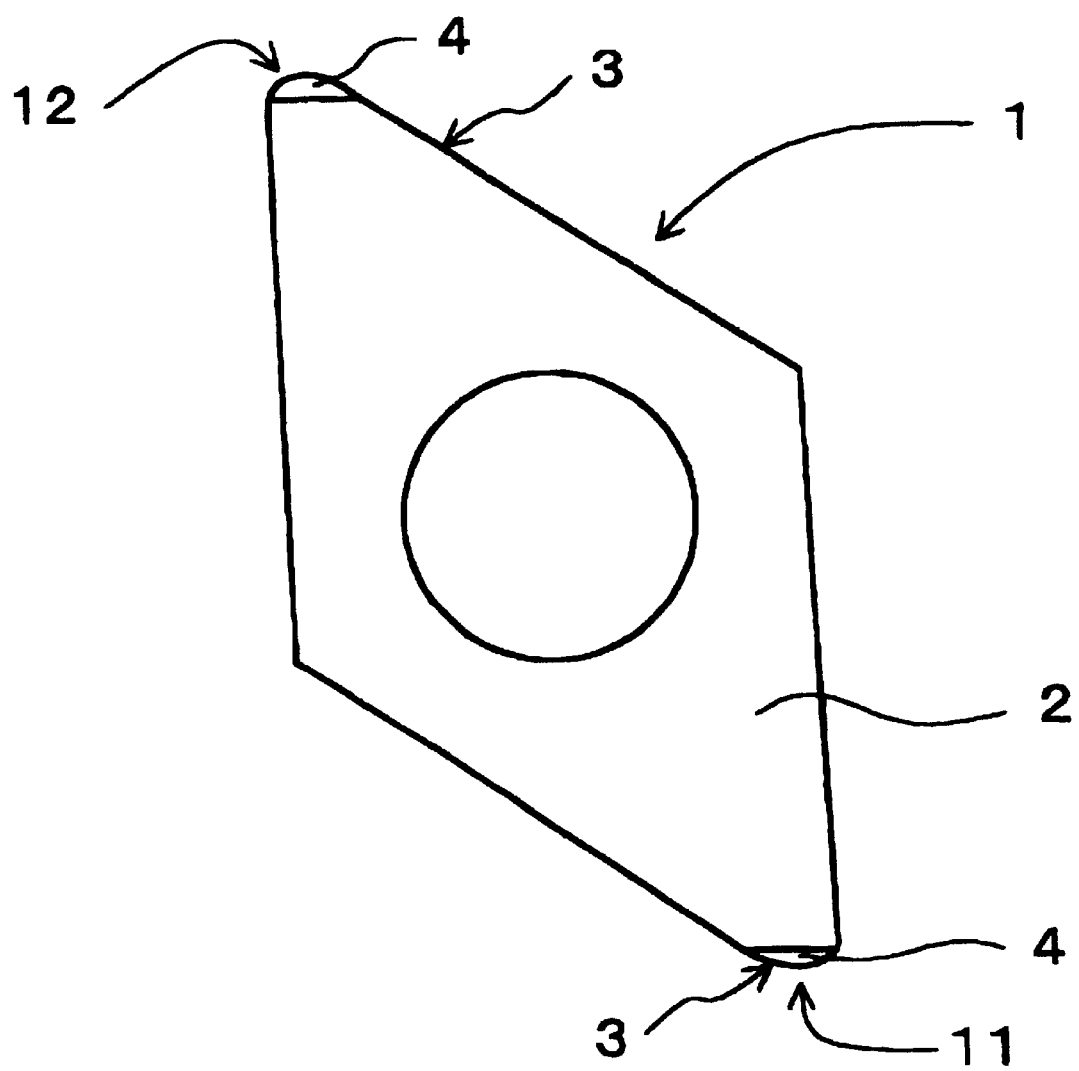
FIG. 8 is an elevation of a cutting tip according to another example of the first embodiment, viewed from the cutting face.
Figure 9:
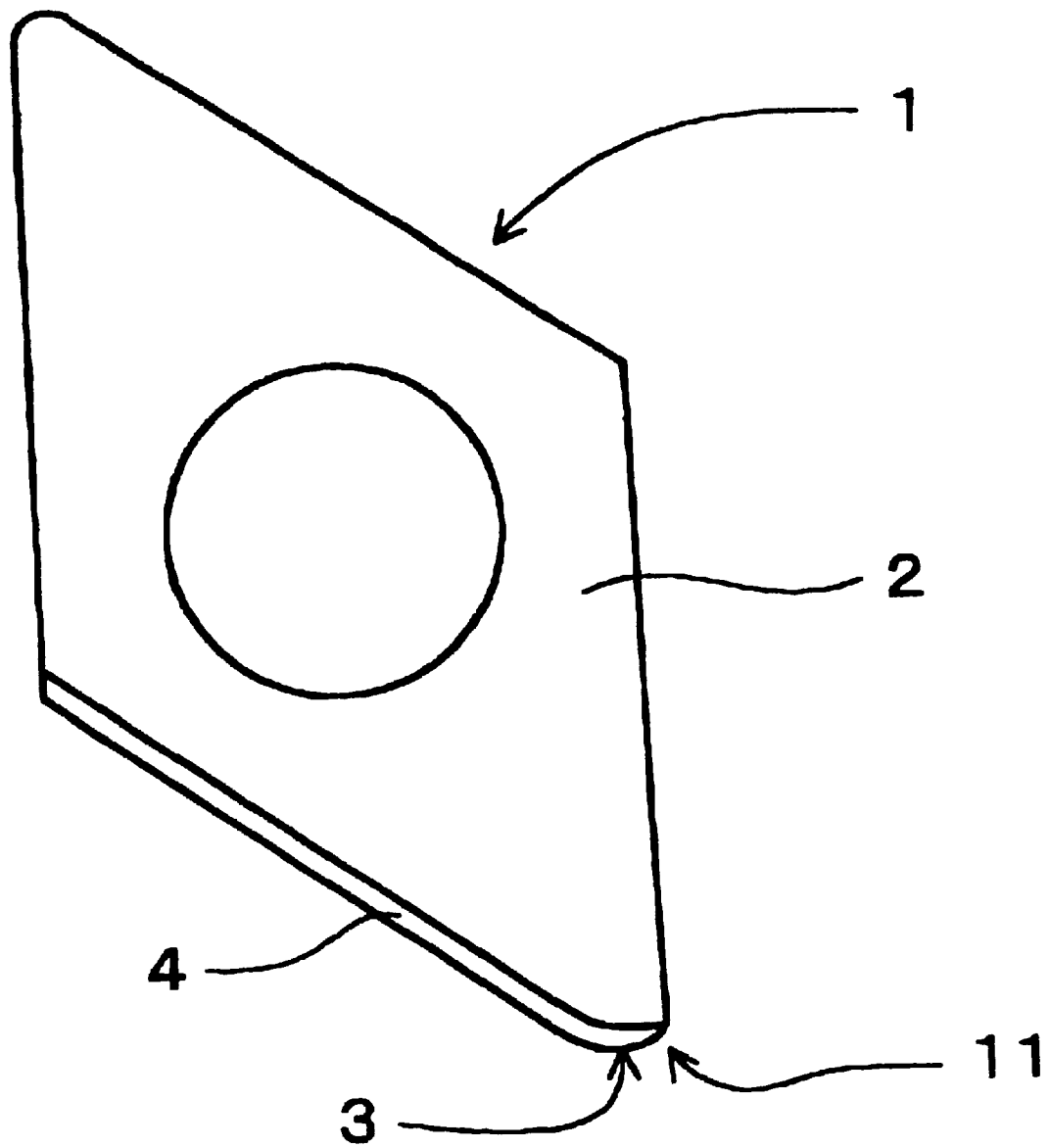
FIG. 9 is an elevation of a cutting tip according to a second embodiment, viewed from the cutting face.
Figure 10:
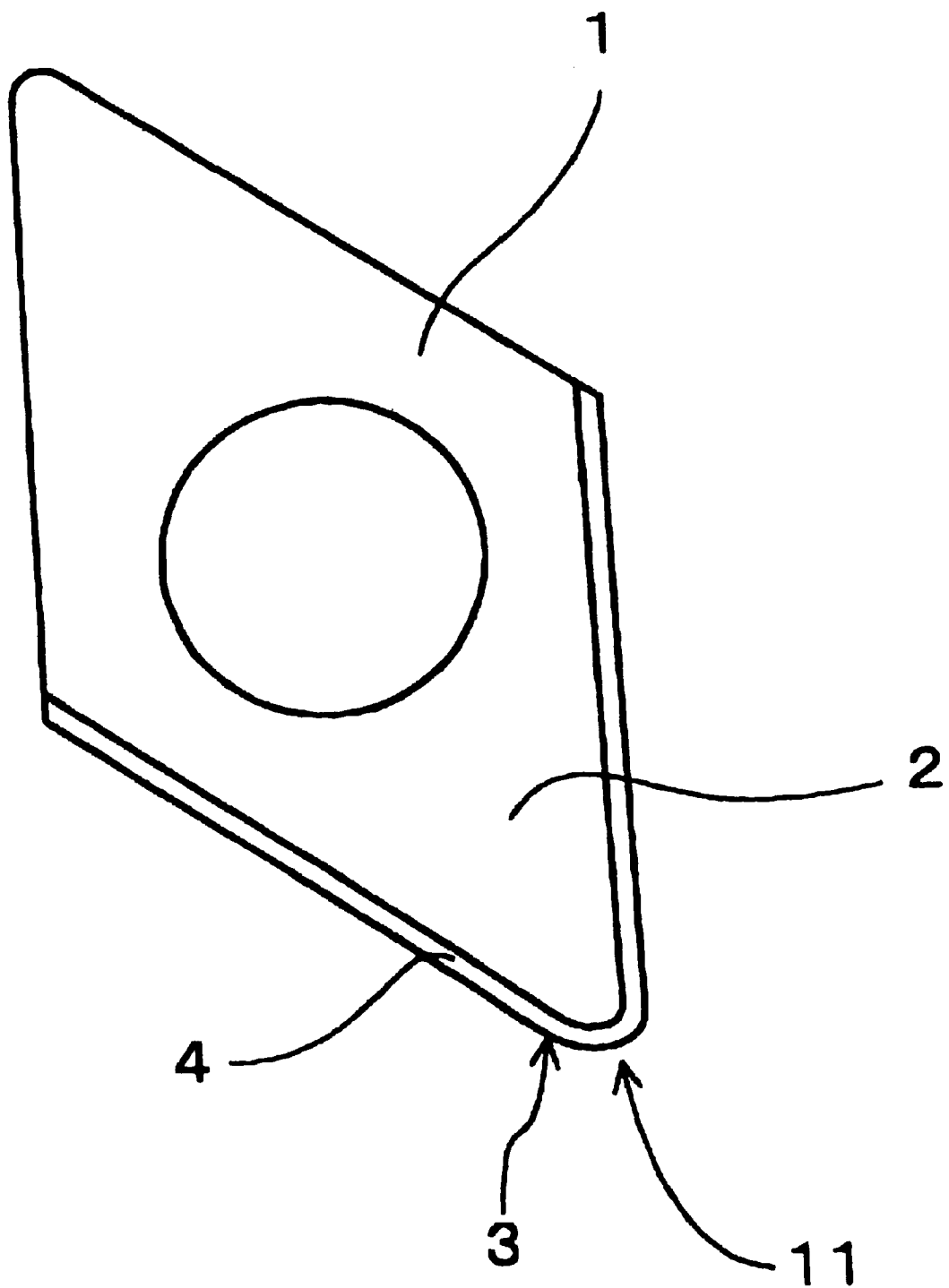
FIG. 10 is an elevation of a cutting tip according to a different example of the second embodiment, viewed from the cutting face.

In this second embodiment, the shape of the compression face 4 of the rhombus-shaped cutting tip 1 is different from that of the first embodiment. FIGS. 8, 9 and 10 show three different shapes for the compression face 4.

The cutting tip 1 shown in FIG. 8 is a tip in which compression faces 4 are provided at both acute angle corner portions 11, 12 of the rhombus. In this case, if one of the corners becomes unusable due to abrasion or the like, the other corner can be used, so that a compression process can still be performed simultaneously with the cutting process in the manner described above.

The cutting tip 1 shown in FIG. 9 is a tip wherein a compression face 4 is provided not only in an acute angle corner 11, but extending entirely over a side portion of the rhombus shape of the cutting face 2. In this case, too, a compression process can be performed simultaneously with a cutting process as in the manner described above. Further, a compression face may also be provided at a side portion that is opposite to the side portion illustrated as having the compression face 4.

The cutting tip 1 shown in FIG. 10 is a tip wherein a compression face 4 is provided along two sides meeting at an acute angle corner of cutting face 2. In this case, too, the compression (work hardening) process can be performed simultaneously with the cutting process in the manner described above. It is also possible to provide a compression face along the sides opposite to the sides illustrated as having the compression face 4. That is, a compression face 4 may also be provided along the entire periphery of the contour of the cutting face 2. With this latter modification, the cutting tip 1 can be set with a greater degree of freedom.

Although the first and second embodiments are described, by way of example, as rhombus-shaped cutting tips, substantially the same advantages can be achieved with the present invention in cutting tips having triangular, quadrangular or other shapes.

The cutting edge 23 formed on the intersection line between the cutting face 2 and the flank face 3 may be provided with a honing face for preventing chipping or the like. In this case, the honing face provides substantially no compression, but advantages substantially the same as those described above can be achieved.

Furthermore, although the first and second embodiments have been illustrated, for example, as used in cutting an outer peripheral surface of a workpiece 8, it should be apparent that such embodiments are applicable to all cutting processes that use cutting tips, such as the cutting of an end surface of a cylindrical element, the cutting of an inner cylindrical surface of a hollow cylindrical element, and the like.

Embodiment 3

This embodiment is an example of a cutting tip used for grooving.

Figure 11:
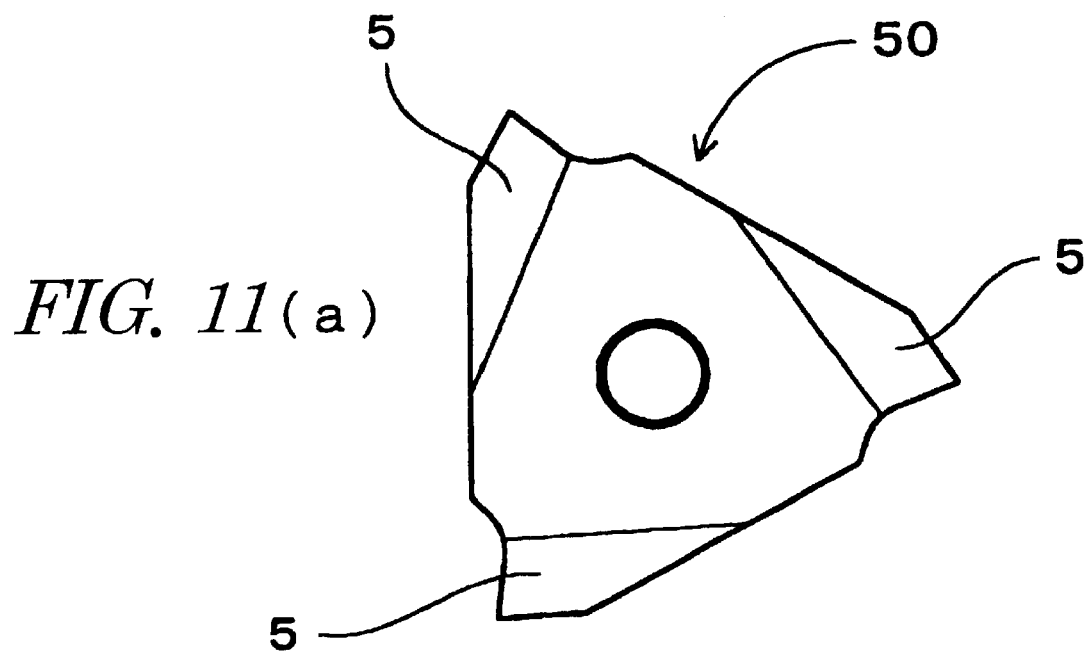
FIG. 11(a) is a side view of a cutting tip according to a third embodiment.
FIG. 11(b) is an elevation of the cutting tip according to a third embodiment.
Figure 11:
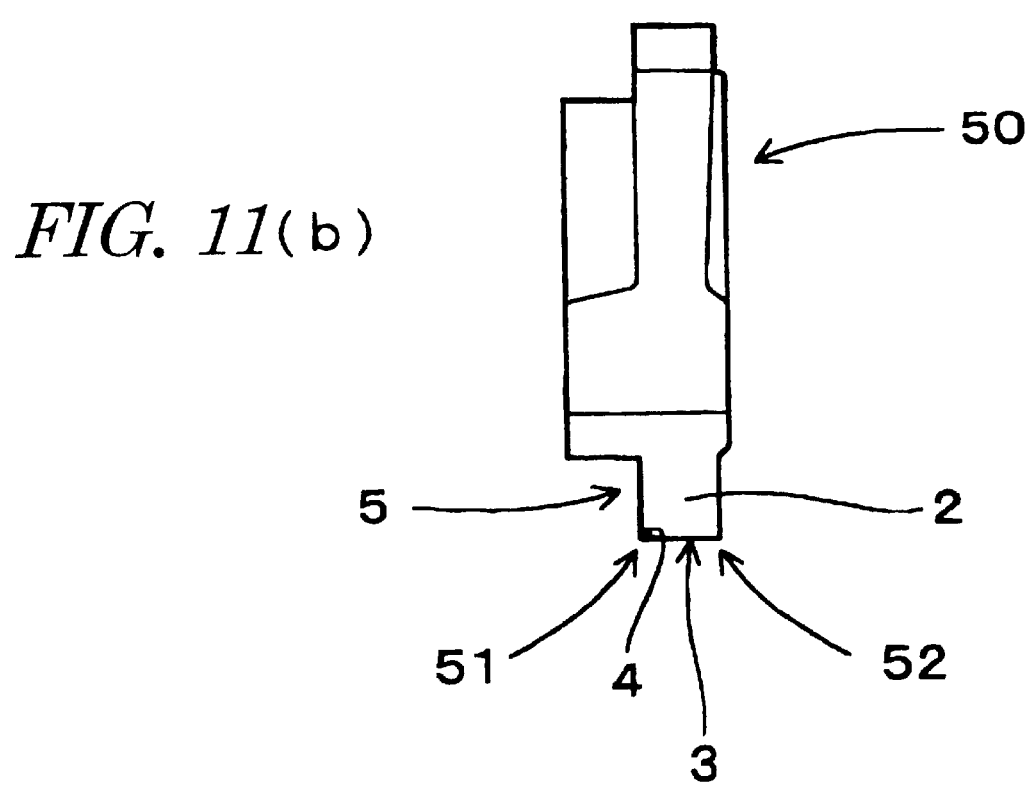

The cutting element 50 of this embodiment, as shown in FIG. 11, has three groove cutting tips 5 which can be selectively switched as they become worn by abrasion.

Figure 12:
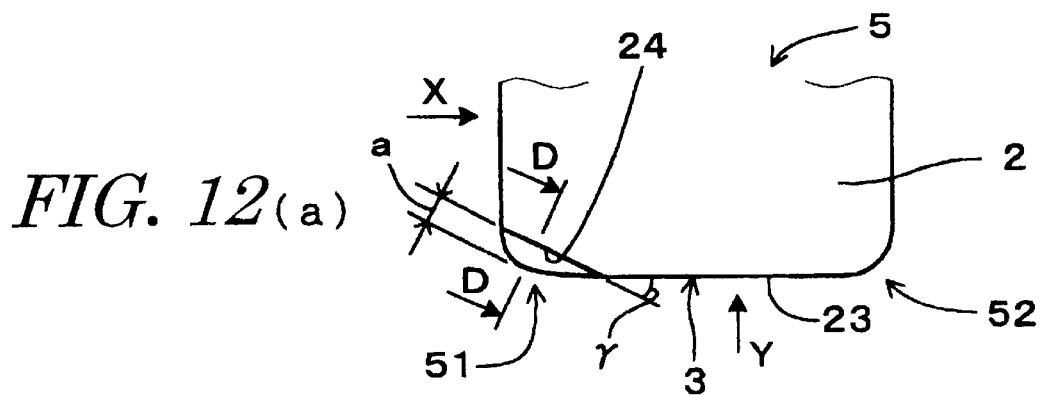
FIG. 12(a) is a view of a cutting face.
FIG. 12(b) is a view in a direction of an arrow Y.
FIG. 12(c) is a view in the direction of an arrow X.
FIG. 12(d) is a sectional view of the cutting tip of the third embodiment taken along line D—D in FIG. 12(a)
Figure 13:
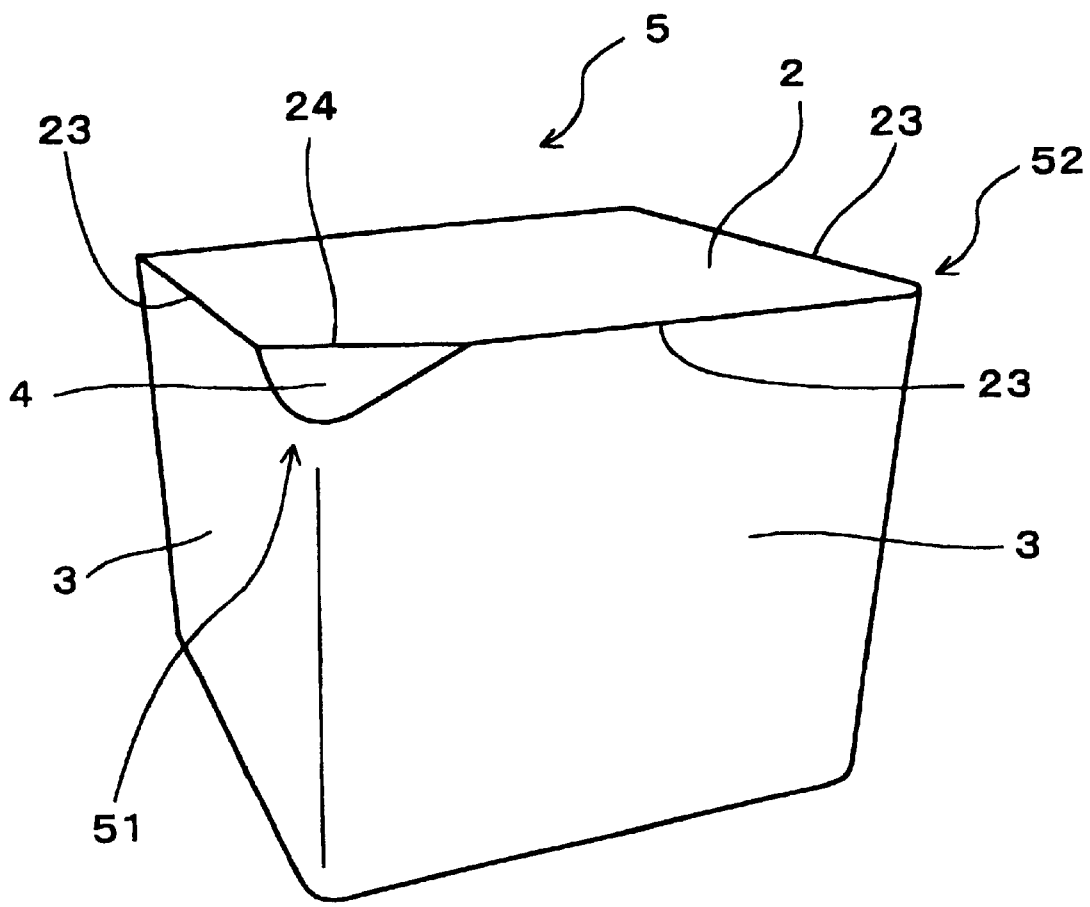
FIG. 13 is a perspective view of the cutting tip of the third embodiment.

As shown in FIGS. 12 and 13, each groove-forming cutting tip 5 has a cutting face 2 and a flank face 3, and further has two corners 51, 52. A compression face 4 for plastically deforming a workpiece 8 is provided between the cutting face 2 and the flank face 3 in corner 51.

The cutting face 2 has a rectangular shape as shown in FIG. 12(*a*). As shown in FIGS. 12(*b*), 12(*c*) and 13, the flank face 3 extends in a squared U-shape along the contour of the cutting face 2, and is constructed so as to intersect the cutting face 2 at an acute angle that is slightly smaller than a right angle.

In each cutting tip 5, all the intersection lines between the cutting face 2 and the flank face 3 form cutting edges 23.

In this embodiment, a compression face 4 is provided in the corner 51. The compression face 4 is provided by, for example, cutting off a portion of the cutting edge 23 on the intersection line between the cutting face 2 and the flank face 3 in the corner 51.

As shown in FIGS. 12 and 13, the compression face 4 is provided so that the intersection line 24 between the compression face 4 and the cutting face 2 is a straight line, and the intersection line 24 with the angle γ formed by the compression face 4 and the downward flank face 3 at about 30 degrees (FIG. 12(*a*)). A cutting edge is formed on the intersection line 24.

With reference to FIG. 12(*d*), the angle ε formed by the compression face 4 and the cutting face 2 may be, for example, about 106 degrees. With reference to FIGS. 12(*a*) and 12(*b*), the height (width) a to the intersection line 24 between the compression face 4 and the cutting face 2 may be, for example, about 0.1 mm from the flank face. The height (width) b of the compression face 4 from the flank face 2 may be, for example, about 0.35 mm.

These dimensions can be changed in accordance with the properties of the material of the workpiece, and the like.

Figure 14A:
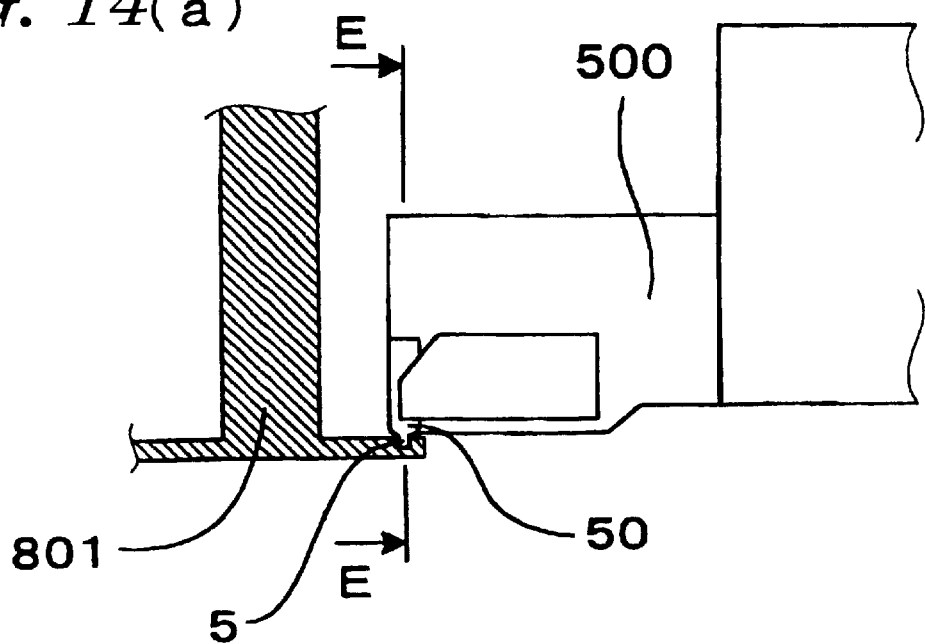
FIG. 14(a) illustrates cutting of a workpiece by the cutting tip.
Figure 14B:
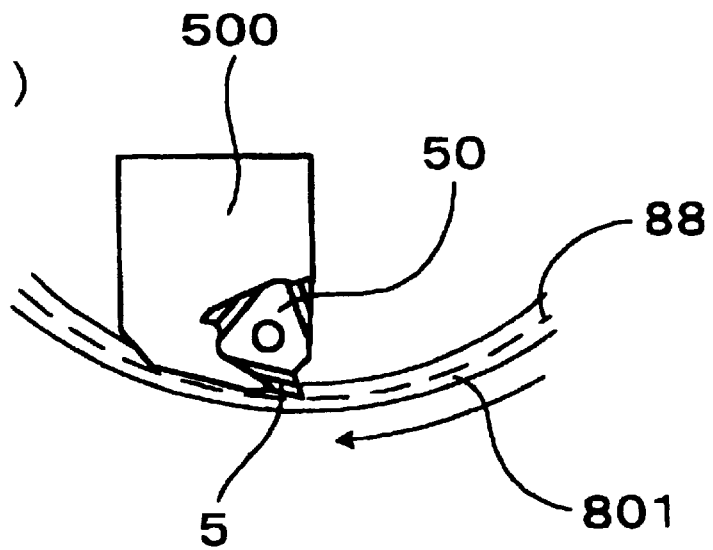
FIG. 14(b) is a perspective sectional view taken along line E—E in FIG. 14(a)
Figure 15A:
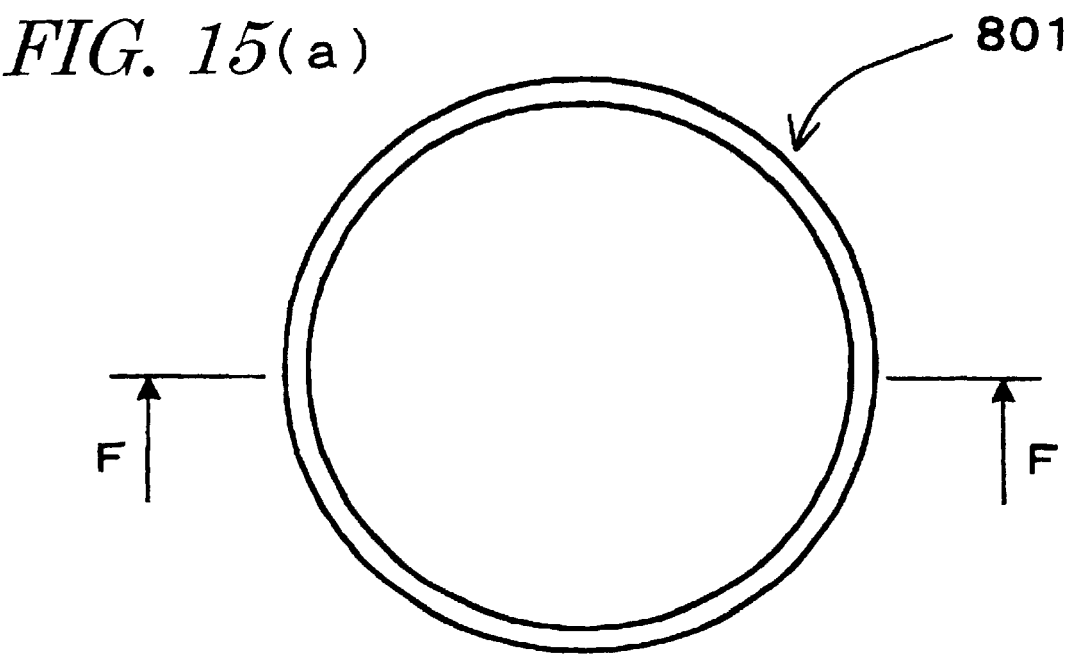
FIG. 15(a) is a plan view of the cutting tip of the third embodiment.
Figure 15B:
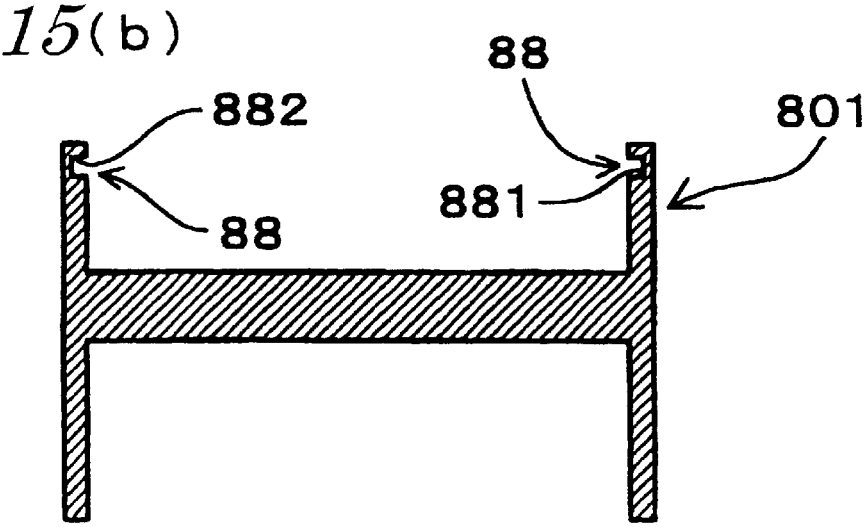
FIG. 15(b) is a perspective sectional view, taken along line F—F in FIG. 15, of a workpiece cut in accordance with the third embodiment.

In using a cutting tip 5 of this embodiment to form a groove 88 in an inner peripheral surface of a cylindrical element 801, as shown in FIG. 15, first, the cylindrical element 801 and a device 500, in which the cutting tip 50 is held, are set in a lathe (not shown) in the relative positions shown in FIG. 14(*a*). That is, the two corners 51, 52 are placed in contact with the workpiece 801, with the cutting face 2 of a cutting tip 5 standing. Then, as shown in FIG. 14(*b*), the cutting tip 5 is moved relative to the workpiece 801 by rotating the workpiece 801. That is, the cutting process forms a groove by a cutting method that is substantially the same as a conventional method except that the cutting tip 5 is used and work-hardening is simultaneously effected to strengthen a bottom angle portion of the groove.

Figure 16:
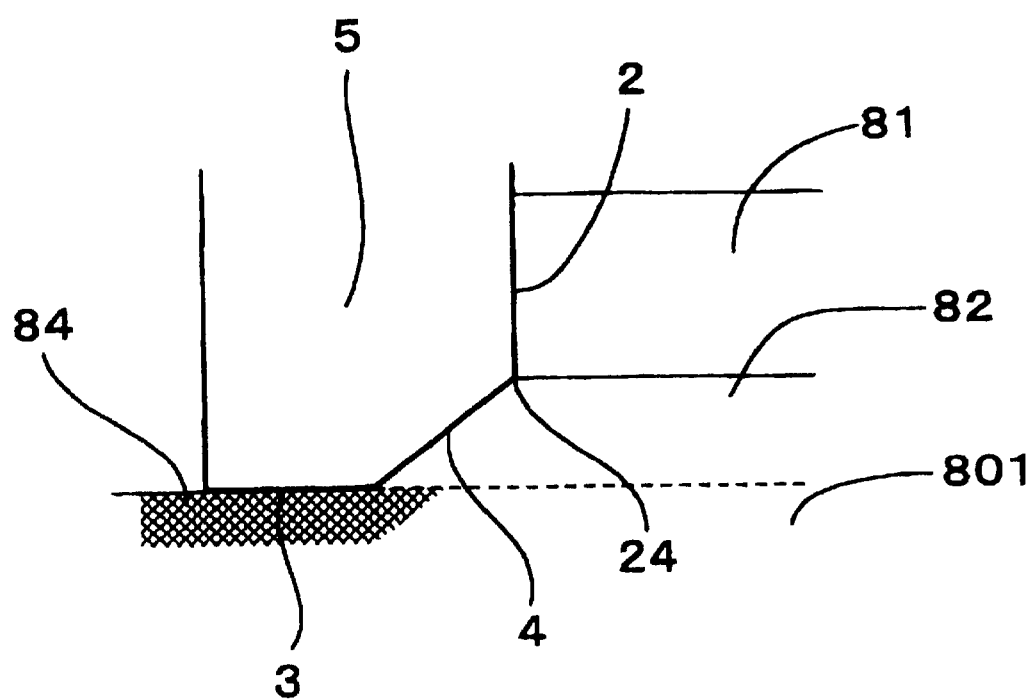
FIG. 16 is a diagram illustrating the work-hardening mechanism operative during cutting according. to the third embodiment.

FIG. 16 illustrates the mechanism of the cutting of the bottom angle portion 881 of the groove 88 corresponding to the corner portion 51 of the cutting tip 5. As shown in FIG. 16, the cutting tip 5, which while remaining in contact with the cylindrical element 8 (the workpiece), is relatively advanced in the cutting direction and separates the material of the workpiece that contacts the cutting face 2, as swarf 81. In this embodiment, since the intersection line 24 between the compression face 4 and the cutting face 2 forms a cutting edge, the swarf 81 is smoothly separated from the remaining portion 82.

Next, the remaining portion 82 of the workpiece 8 which faces the compression face 4 is pressed by the compression face 4 and is thereby undergoes plastic deformation, as the cutting tip 5 relatively advances. As a result, the remaining portion 82 is left in the bottom angle portion 881 of the groove 88, as a work-hardened portion 84, and the groove 88 cut by the cutting tip 1 has one bottom angle portion 881 strengthened due to the presence of the work-hardened portion 84.

Thus, if the cutting tip 5 of this embodiment is used, it is possible to easily strengthen the bottom angle portion of the groove merely by performing an otherwise substantially conventional cutting operation without adding a separate process step. Furthermore, the work-hardened portion 84 can be uniformly provided as long as the cutting parameters (conditions) remain constant.

Therefore, the finished cylindrical element 801 is a low-cost element that has a groove with excellent strength. Hence, a machine constructed by using this finished product as an element thereof has improved durability and the like.

Embodiment 4

Figure 17:
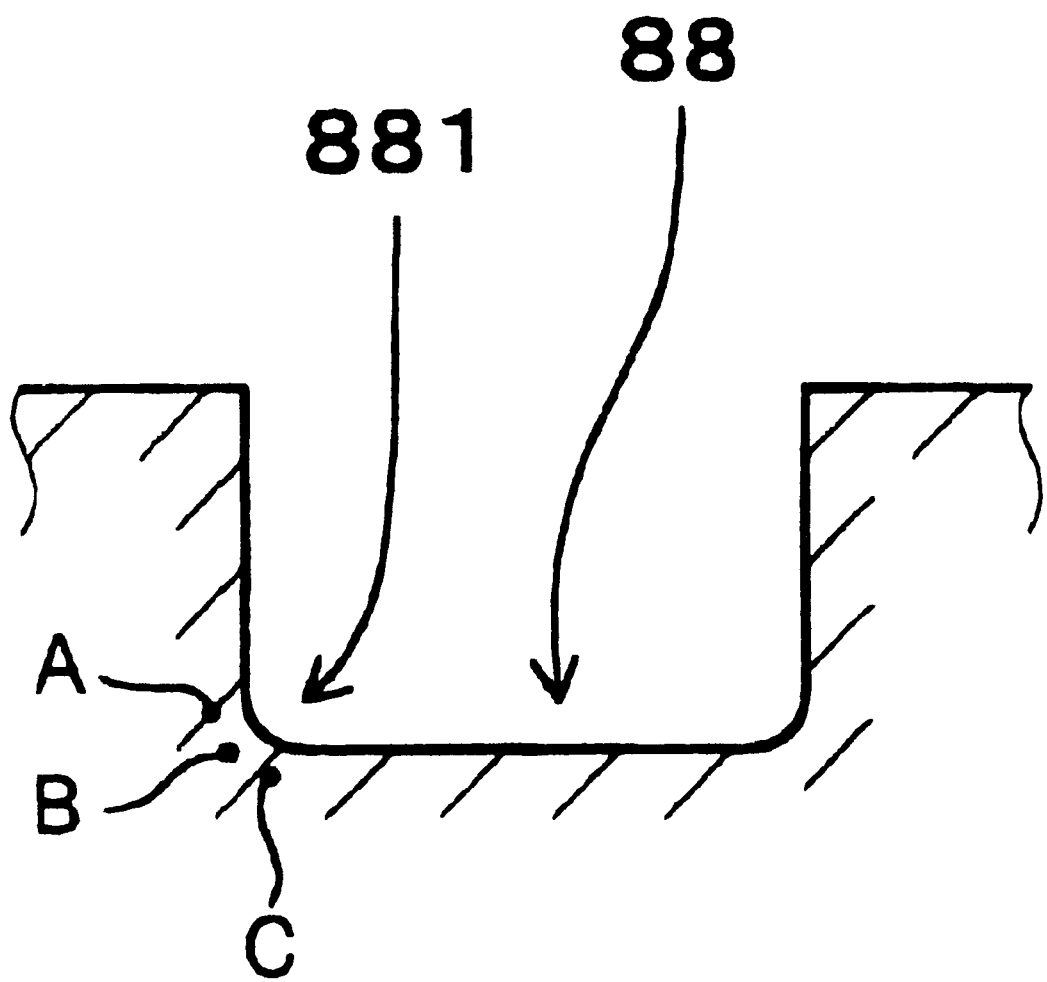
FIG. 17 is a diagram showing a grooved section of a workpiece formed in accordance with a fourth embodiment and further showing hardness measurement points.

In this fourth embodiment, the advantage achieved by the use of cutting tip 5 of the third embodiment was quantitatively measured. More specifically, as shown in FIG. 17, in a groove 88 formed by the cutting tip 5, hardnesses at three points A, B, C near a bottom angle portion 881, through which the compression face 4 passed, were measured. For comparison, hardnesses at the same positions (A, B, C) in a groove formed by using a conventional cutting tip, i.e. without a face 4, were also measured.

Figure 18:
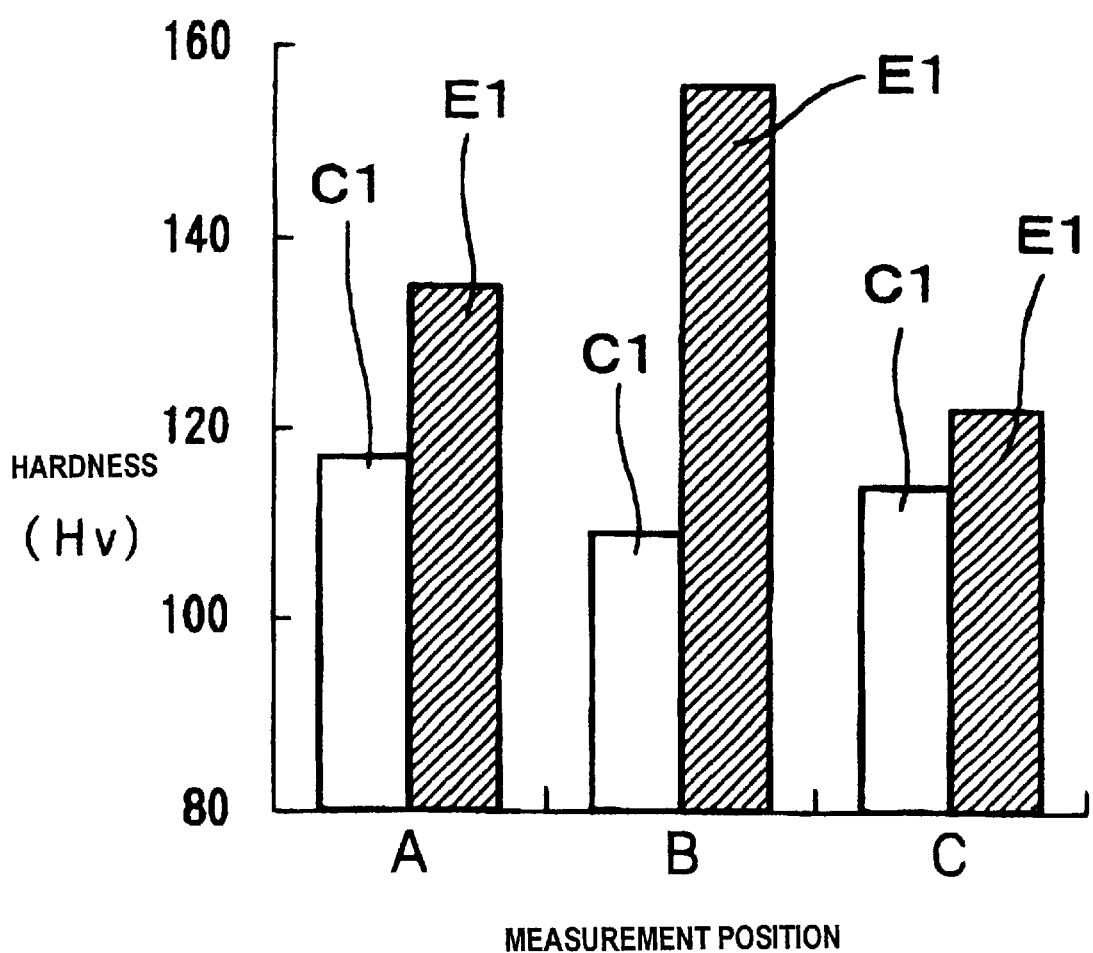
FIG. 18 is a graph showing results of the hardness measurements for the fourth embodiment;.

The results of the measurements are shown in FIG. 18. In FIG. 18, the horizontal axis indicates measurement position, and the vertical axis indicates hardness. Measurements for the groove obtained using the cutting tip 5 of the present invention, i.e. having a compression face 4, are indicated as E1, and measurements for the groove obtained with the conventional cutting tip are indicated as C1.

As can be understood from FIG. 18, at all the measurement points, the hardness of the bottom angle portion 881 of the groove 88 formed by using the cutting tip of the third embodiment was greatly improved in comparison with the conventional case.

Embodiment 5

Figure 19:
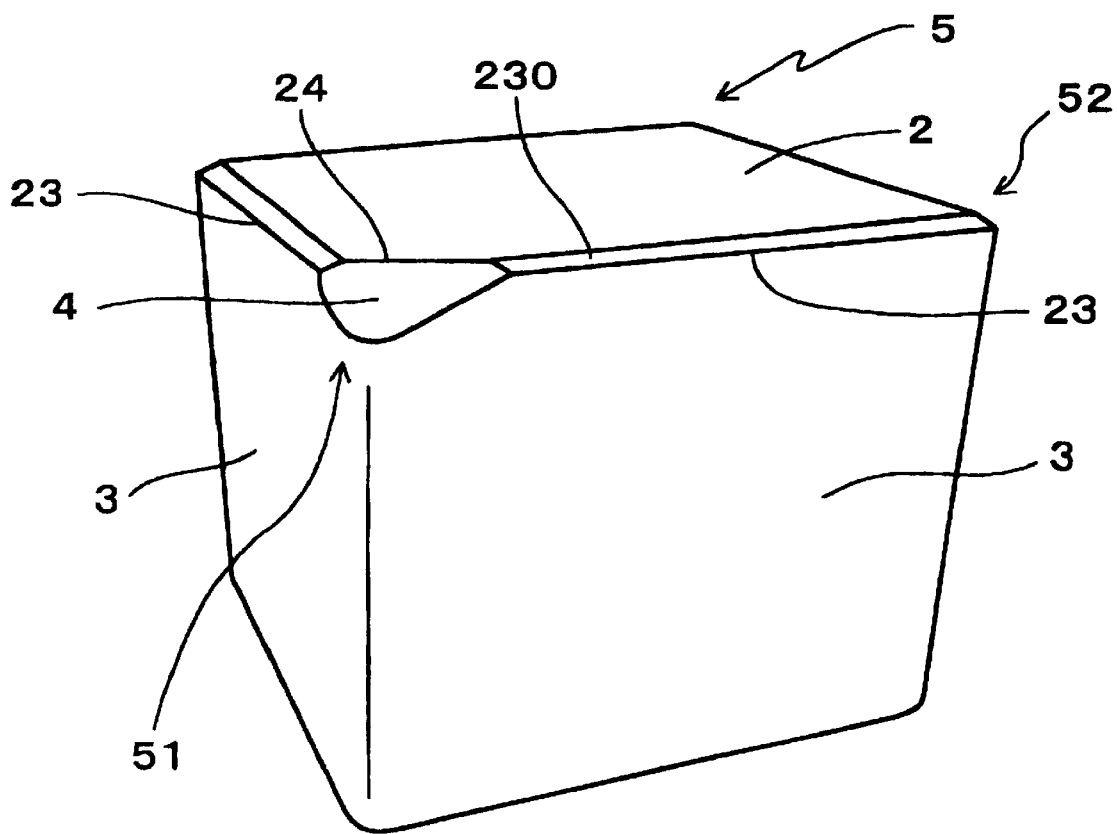
FIG. 19 is a perspective view of a cutting tip according to a fifth embodiment of the present invention.

A fifth embodiment is shown in FIG. 19, wherein a honing face 230 is additionally provided on the cutting edge formed on intersection line 23 between cutting face 2 and flank face 3 of the cutting tip 5 of the third embodiment.

As shown in the diagram, the honing face 230 has a narrower width than compression face 4. The angle formed between the honing face 230 and the cutting face 2 is greater than an angle ε formed by the compression face 4 and the cutting face 2. Therefore, where the honing face 230 is provided, an intersection line between the honing face 230 and the flank face 3 forms a distal end of the cutting edge 23, in microscopic view.

In this embodiment, too, during the cutting, a work-hardened portion 84 is created by plastic deformation only in a bottom angle portion of a groove through which the corner portion 51, having the compression face 4, has passed, as in the third embodiment. Since substantially no compression occurs at the honing face 230, a work-hardened portion is not formed in that portion. However, substantially all of the advantages attributed above to the third embodiment are achieved.

Although the third, fourth and fifth embodiments have been described as having a compression face 4 formed only at a single corner portion 51, it is also possible to form a compression face 4 at corner portion 52. In this latter case, work-hardened portions 84 can be provided in both side bottom angle portions of a groove 80.

Embodiment 6

Figure 20:
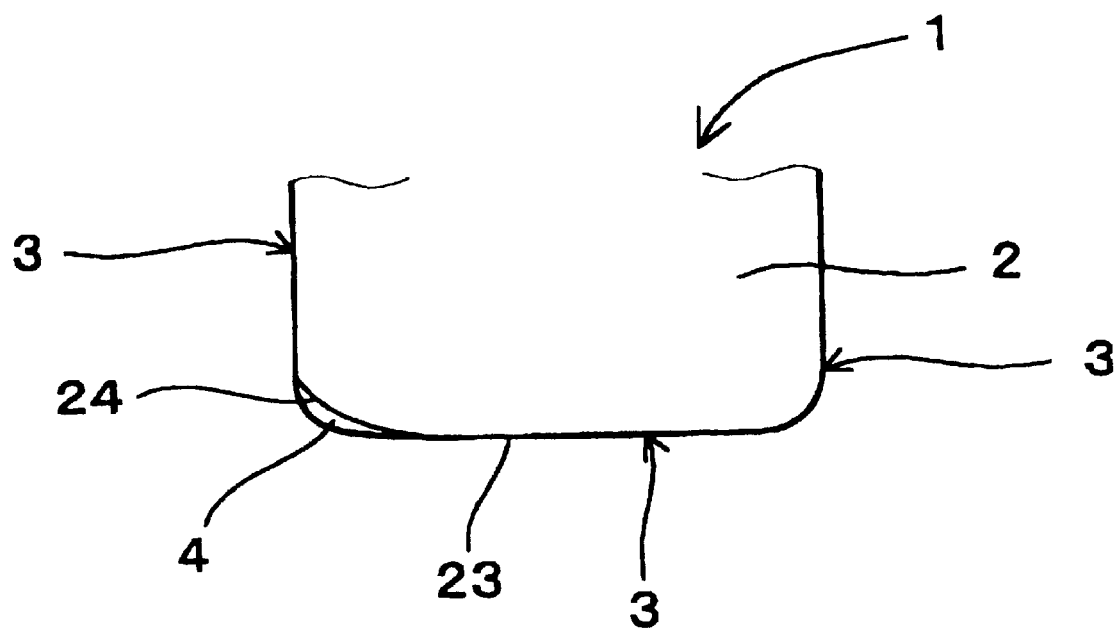
FIG. 20 is a view of a cutting tip from the cutting face, according to a sixth embodiment of the present invention.
Figure 21:
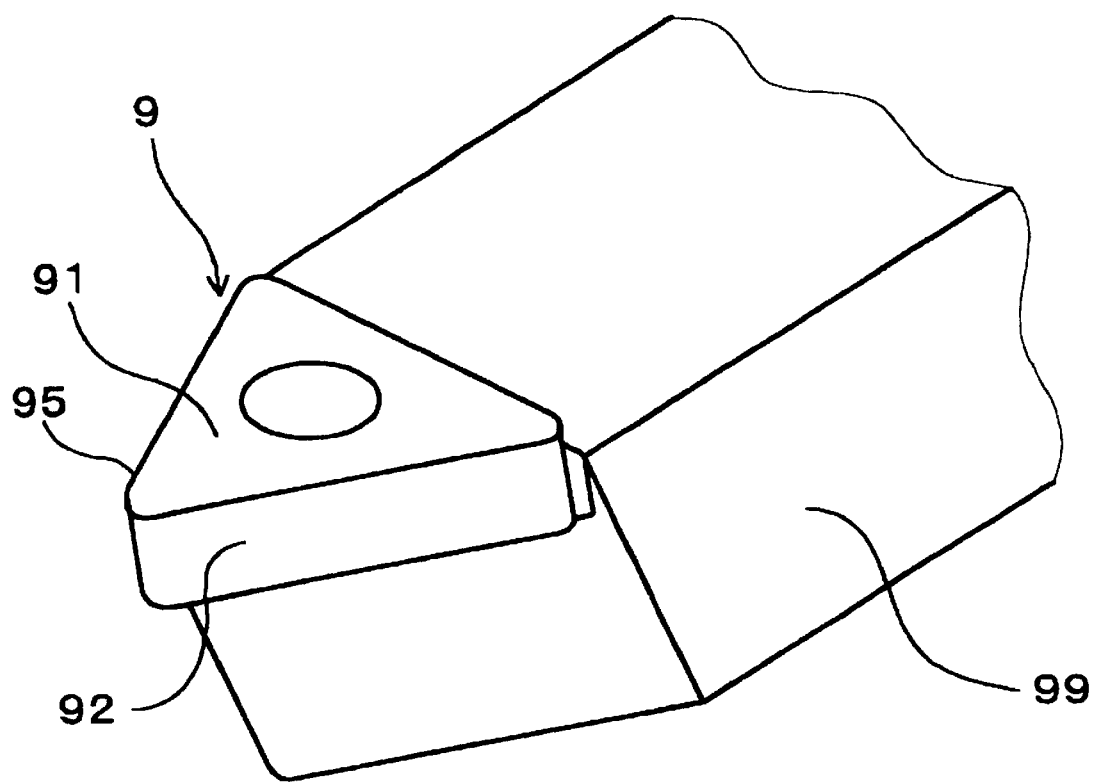
FIG. 21 is perspective view of a conventional cutting tip.

This embodiment, shown in FIG. 20, is a modification of the third embodiment wherein the compression face 4 of cutting tip 1 is a curved face, and intersection line 24 between the compression face 4 and cutting face 2 is a curved line.

In this sixth embodiment, the shape of the compression face 4 is more similar to the shape of the bottom angle portion 881 of groove 88. Therefore, the strength of the bottom angle portion 881, for example, at the points A to C (FIG. 17), can be more uniformly improved. Moreover, this sixth embodiment achieves substantially all the advantages mentioned above in connection with the third embodiment.

As described above, the present invention provides a cutting tip that allows a compression process to be easily performed on a cut surface without an additional, separate process step, and a cutting method using the cutting tip.

While the present invention has been described with reference to what are presently considered to be preferred embodiments thereof, it is to be understood that the invention is not limited to the disclosed embodiments or constructions. On the contrary, the invention is intended to cover various modifications and equivalent arrangements.

What is claimed is:

1. A cutting tip comprising: a cutting face for separating a portion of a workpiece as swarf, a flank face, and a compression face for plastically deforming material of a workpiece during cutting, said compression face: (1) intersecting the cutting face to form a cutting edge, (2) intersecting the flank face to define a line of intersection, (3) extending from said cutting edge to said line of intersection, and (4) trailing said cutting edge in cutting.

2. A cutting tip according to claim 1, wherein said compression face extends from said cutting edge to a distal end of the cutting tip at said line of intersection through a distance which defines the amount of plastic deformation applied to the workpiece.

3. A cutting tip according to claim 1, wherein the compression face and the cutting face intersect at an angle less than 125 degrees to form said cutting edge.

4. A cutting tip according to claim 3, wherein said compression face extends from said cutting edge to a distal end of the cutting tip at said line of intersection and through a distance which defines the amount of plastic deformation applied to the workpiece.

5. A cutting tip according to claim 1 wherein two flank faces intersect said cutting face and an opposing surface opposite said cutting face to form side edges, and wherein said two flank faces meet at a distal end, said distal end extending perpendicular to said opposing surface, from said opposing surface to intersection with said compression face.

6. A cutting tip according to claim 5 wherein said cutting edge intersects both side edges formed by intersection of said two flank faces with said cutting face.

7. A cutting tip according to claim 1 wherein said compression face extends from said cutting edge outward toward a workpiece when said cutting tip is cutting the workpiece.

8. A cutting method for cutting a workpiece by using a cutting tip comprising a cutting face for separating a portion of a workpiece as swarf, a flank face, and a compression face: (1) intersecting the cutting face to form a cutting edge, (2) intersecting the flank face to define a line of intersection, (3) extending from said cutting edge to said line of intersection, and (4) trailing said cutting edge in cutting, said method comprising:

contacting the workpiece with the cutting tip, with the cutting face leading in the direction of cutting;

moving the cutting tip relative to the workpiece to cut away, as swarf, workpiece material facing said cutting face; and then compressing workpiece material remaining adjacent to and trailing the cut and facing the compression face to plastically deform the remaining material with the compression face.

9. A cut workpiece having a cut-finished surface formed by using a cutting tip which has a cutting face for separating a portion of a workpiece as swarf, a flank face and a compression face, said compression face: (1) intersecting the cutting face to form a cutting edge, (2) intersecting the flank face to define a line of intersection, (3) extending from said cutting edge to said line of intersection, and (4) trailing said cutting edge in cutting, and wherein said cut-finished surface has a work-hardened portion formed by plastic deformation caused by pressing with the compression face.

10. A cutting tip in the form of a rhombus comprising: a cutting face for separating a portion of a workpiece as swarf, flank faces intersecting at angles to define distal ends opposed diagonally across the cutting face, and a compression face for plastically deforming material of a workpiece, said compression face located between the cutting face and a flank face at one of said distal ends, said compression face: (1) intersecting the cutting face to form a first cutting edge, (2) intersecting a flank face to define a line of intersection, (3) extending from said cutting edge to said line of intersection and toward one of said distal ends and away from a distal end opposing said one distal end, and (4) trailing said cutting edge in cutting.

11. A cutting tip according to claim 10 wherein said angles are acute angles.

12. A cutting tip according to claim 10, further comprising a honing face formed on a second cutting edge defined by an intersection line between the cutting face and a flank face, and wherein an angle formed between the compression face and the cutting face at said first cutting edge is smaller than an angle formed by intersection between the honing face and the cutting face, and a maximum width of the compression face viewed from the cutting face being greater than a maximum width of the honing face.

13. A cutting tip according to claim 10 wherein said cutting edge is a straight line.

14. A cutting tip according to claim 10 wherein two flank faces intersect said cutting face and an opposing surface opposite said cutting face to form side edges, and wherein said two flank faces meet at a distal end, said distal end extending perpendicular to said opposing surface, from said opposing surface to intersection with said compression face.

15. A cutting tip according to claim 14 wherein said cutting edge intersects both side edges formed by intersection of said two flank faces with said cutting face.

16. A cutting tip according to claim 10 wherein said compression face extends from said cutting edge outward toward a workpiece when said cutting tip is cutting the workpiece.

17. A cutting tip for cutting a groove comprising: a cutting face for separating a portion of a workpiece as swarf, flank faces intersecting at angles to define two distal ends opposed diagonally across the cutting face, and a compression face for plastically deforming material of a workpiece provided between said cutting face and said flank face in at least one of said corner portions, said compression face: (1) intersecting the cutting face to form a first cutting edge, (2) intersecting a flank face to define a line of intersection, (3) extending from said cutting edge to said line of intersection and toward one of said distal ends and away from a distal end opposing said one distal end, and (4) trailing said cutting edge in cutting.

18. A cutting tip according to claim 17, additionally comprising a honing face contiguous and coextensive with a second cutting edge, said honing face intersecting said cutting face and one flank face, with the second cutting edge extending along a line of intersection between said honing face and said one flank face, and wherein an angle formed between the compression face and the cutting face at said first cutting edge is smaller than an angle formed at the intersection between the honing face and the cutting face, and a maximum width of the compression face viewed from the cutting face being greater than a maximum width of the honing face.

19. A cutting tip according to claim 17, wherein said first cutting edge is a straight line.

20. A cutting method for forming a groove in a workpiece with a cutting tip having a cutting face for separating a portion of a workpiece as swarf, flank faces intersecting at angles to define two corner portions, and a compression face provided between the cutting face and the flank face in at least one of the corner portions, said compression face: (1) intersecting the cutting face to form a first cutting edge at said corner portion, (2) intersecting a flank face to define a line of intersection, (3) extending from said cutting edge to said line of intersection, and (4) trailing said cutting edge in cutting, said method comprising:

contacting the workpiece with the cutting tip, with the cutting face leading in the direction of cutting;

moving the cutting tip relative to the workpiece to cut away, as swarf, workpiece material facing the cutting face and to form a groove in a surface of the workpiece; and then compressing workpiece material at a position corresponding to one of the corner portions and remaining in a bottom angle portion of the groove and facing the compression face, trailing the cutting edge to plastically deform the remaining material by pressing with the compression face.

21. A workpiece having a groove with bottom angle portions cut therein by using a cutting tip which has a cutting face for separating a portion of a workpiece as swarf, flank faces intersecting at angles to define two corner portions, and a compression face between the cutting face and a flank face in at least one of the corner portions, the compression face: (1) intersecting the cutting face to form a first cutting edge at said corner portion, (2) intersecting a flank face to define a line of intersection, (3) extending from said cutting edge to said line of intersection, and (4) trailing said cutting edge in cutting, at least one of said bottom angle portions of the groove having a work-hardened portion formed by plastic deformation caused by pressing with the compression face.

* * * * *